United States Patent
Moore, Jr. et al.

(10) Patent No.: US 11,164,195 B2
(45) Date of Patent: Nov. 2, 2021

(54) INCREASING SALES EFFICIENCY BY IDENTIFYING CUSTOMERS WHO ARE MOST LIKELY TO MAKE A PURCHASE

(71) Applicant: INTERNATIONAL BUSINESS MACHINES CORPORATION, Armonk, NY (US)

(72) Inventors: John E. Moore, Jr., Brownsburg, IN (US); Jeffrey K. Price, Austin, TX (US); Robert R. Wentworth, Round Rock, TX (US); Stanley C. Wood, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1016 days.

(21) Appl. No.: 15/431,836

(22) Filed: Feb. 14, 2017

(65) Prior Publication Data
US 2018/0232749 A1 Aug. 16, 2018

(51) Int. Cl.
*G06Q 30/02* (2012.01)
*G06Q 10/06* (2012.01)

(52) U.S. Cl.
CPC ....... *G06Q 30/0202* (2013.01); *G06Q 10/067* (2013.01)

(58) Field of Classification Search
CPC .... G06Q 30/0201; G06Q 30/06; G06Q 30/02; G06Q 20/20; G06Q 10/087
USPC ................................................ 705/7.11–7.42
See application file for complete search history.

(56) References Cited

U.S. PATENT DOCUMENTS

| | | | | |
|---|---|---|---|---|
| 4,972,504 A | * | 11/1990 | Daniel, Jr. | G06Q 20/387 455/2.01 |
| 8,781,917 B2 | | 7/2014 | Westphal et al. | |
| 2001/0039519 A1 | * | 11/2001 | Richards | G06Q 30/02 705/7.35 |
| 2002/0121979 A1 | * | 9/2002 | Smith | G08B 13/2462 340/572.1 |

(Continued)

OTHER PUBLICATIONS

Sharp, et al., "Fundamental Patterns of in-store shopper behavior", Journal of Retailing and Consumer Services, Feb. 2017, pp. 1-48. (Year: 2017).*

(Continued)

*Primary Examiner* — Amber A Misiaszek
(74) *Attorney, Agent, or Firm* — Cantor Colburn LLP; Samuel Waldbaum

(57) ABSTRACT

Embodiments of the invention include methods, systems and computer program products for predicting customer purchasing behavior. Aspects include receiving, from a sensor, first customer sensor data about a first customer in a store, wherein the first customer sensor data includes accompaniment data about one or more accompaniments of the first customer. A determination is made that the first customer is known based at least in part on the first customer sensor data. Based at least in part on determining that the first customer is known, a customer profile for the first customer is accessed, wherein the customer profile includes historical customer data. The accompaniment data and the customer profile are analyzed to determine a first sales strategy for the first customer. One or more sales techniques can be generated based on the sales strategy for the first customer.

20 Claims, 5 Drawing Sheets

(56) References Cited

U.S. PATENT DOCUMENTS

| | | | |
|---|---|---|---|
| 2003/0028425 A1 | 2/2003 | Zane et al. | |
| 2004/0111454 A1* | 6/2004 | Sorensen | G06Q 30/02 |
| | | | 708/200 |
| 2005/0149392 A1 | 7/2005 | Gold et al. | |
| 2009/0083121 A1* | 3/2009 | Angell | G06Q 30/02 |
| | | | 705/7.33 |
| 2009/0187466 A1* | 7/2009 | Carter | G06Q 30/02 |
| | | | 705/7.34 |
| 2010/0250305 A1* | 9/2010 | Lee | G06Q 10/06316 |
| | | | 705/7.26 |
| 2011/0153393 A1 | 6/2011 | Raff et al. | |
| 2011/0257985 A1 | 10/2011 | Goldstein | |
| 2011/0295670 A1 | 12/2011 | Thomas et al. | |
| 2012/0095589 A1 | 4/2012 | Vapnik | |
| 2013/0129210 A1 | 5/2013 | Na | |
| 2015/0168538 A1* | 6/2015 | Bradley | G01S 5/18 |
| | | | 367/127 |
| 2015/0170550 A1* | 6/2015 | Jubro | G09F 3/02 |
| | | | 40/662 |
| 2015/0303798 A1 | 12/2015 | Aihara et al. | |
| 2017/0300999 A1* | 10/2017 | Wilkinson | G06F 16/288 |
| 2018/0300788 A1* | 10/2018 | Mattingly | G06Q 30/016 |

OTHER PUBLICATIONS

Authors et al.: Disclosed Anonymously, "Apparatus and Method for Improving Customer Satisfaction and Sales," IPCOM000245018D, Feb. 6, 2016, pp. 1-5.

\* cited by examiner

INCREASING SALES EFFICIENCY BY IDENTIFYING CUSTOMERS WHO ARE MOST LIKELY TO MAKE A PURCHASE

BACKGROUND

The present invention relates in general to increasing sales efficiency and, more specifically, to methods, systems and computer program products for increasing sales efficiency by analyzing a customer's accompaniment and personal state and comparing historical trends.

Retail establishments often struggle to identify the desires and habits of their customers based on their individual purchases. As technology continues to advance, additional data can be gathered in real time about a customer as they enter a retail store. Certain indications of a customer's state of being, either financially or emotionally, can help determine if a customer is merely "window shopping" or if they intend to purchase an item from the store.

SUMMARY

Embodiments of the invention include a computer-implemented method for predicting customer purchasing behavior. The method includes receiving, from a sensor, first customer sensor data about a first customer in a store, wherein the first customer sensor data includes one or more accompaniment data about accompaniments of the first customer. A determination is made that the first customer is known based on the first customer sensor data. Based at least in part on determining that the first customer is known, a customer profile for the first customer is accessed, wherein the customer profile includes historical customer data. The accompaniment data and the customer profile are analyzed to determine a first sales strategy for the first customer. One or more sales techniques can be generated based on the sales strategy for the first customer.

Embodiments of the invention include a computer system for predicting customer purchasing behavior. The computer system includes a processor configured to perform a method. The method includes receiving, from a sensor, first customer sensor data about a first customer in a store, wherein the first customer sensor data includes accompaniment data about one or more accompaniments of the first customer. A determination is made that the first customer is known based on the first customer sensor data. Based at least in part on determining that the first customer is known, a customer profile for the first customer is accessed, wherein the customer profile includes historical customer data. The accompaniment data and the customer profile are analyzed to determine a first sales strategy for the first customer. One or more sales techniques can be generated based on the sales strategy for the first customer.

Embodiments of the invention include a computer program product for predicting customer purchasing behavior. The computer program product includes a non-transitory computer readable storage medium having computer readable program code embodied therewith. The computer readable program code is configured to perform a method that includes receiving, from a sensor, first customer sensor data about a first customer in a store, wherein the first customer sensor data includes accompaniment data about one or more accompaniments of the first customer. A determination is made that the first customer is known based on the first customer sensor data. Based at least in part on determining that the first customer is known, a customer profile for the first customer is accessed, wherein the customer profile includes historical customer data. The accompaniment data and the customer profile are analyzed to determine a first sales strategy for the first customer. One or more sales techniques can be generated based on the sales strategy for the first customer.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
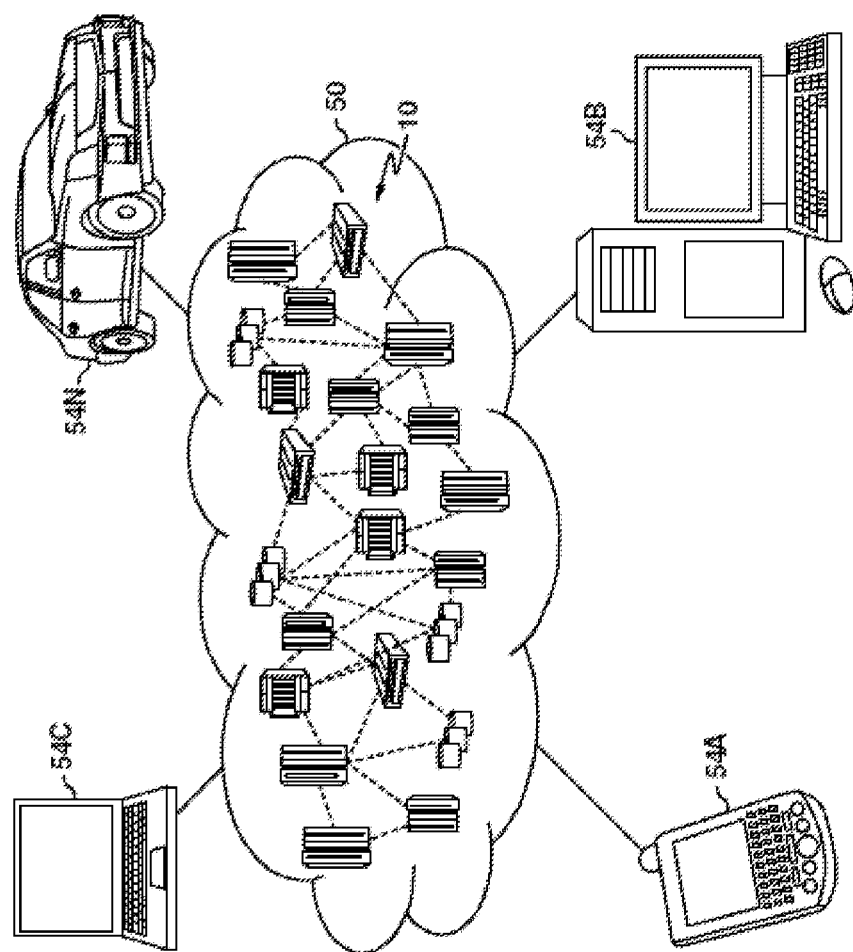
FIG. 1 depicts a cloud computing environment according to one or more embodiments of the present invention.

In accordance with exemplary embodiments of the invention, methods, systems and computer program products for predicting customer purchasing behavior are provided. In one or more embodiments of the invention, a retail establishment, such as a clothing store, can utilize a camera or any other type of sensor to identify a prospective customer by gathering and evaluating prospective customer data from a variety of novel customer data sources. Examples of such novel customer data sources include, but are not limited to, accompaniments (e.g., people entering the retail establishment along with the prospective customer), environmental data (e.g., weather, crowding, financial state, temperature, or any other data that leads to a more accurate forecast), gender, clothing; age, individual purchase history (e.g., identifying an individual using facial recognition, key fob, Bluetooth®, etc.). Once a customer has been identified as a prospective customer (i.e., a customer who is likely to make a purchase) using aspects of the present invention, the staff of a retail establishment can be directed to the prospective customer. Coupons and discounts, some of which are targeted to meet determined priorities of the prospective customers, can be presented to the prospective customers to influence their purchasing decisions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
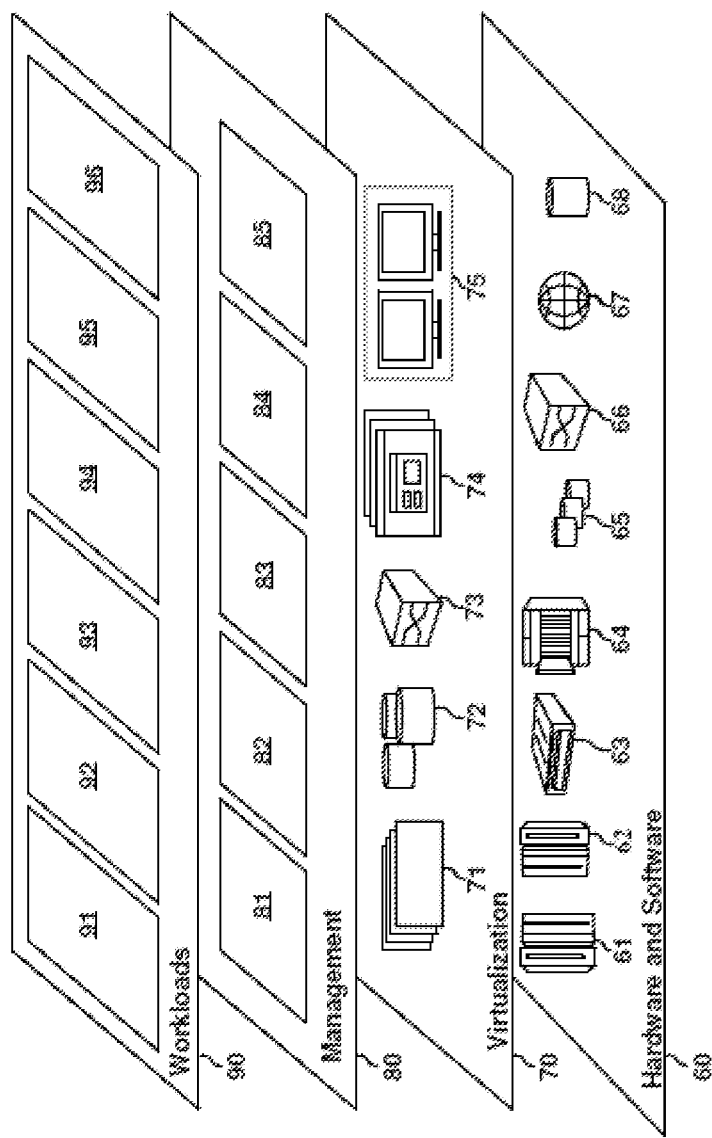
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predicting customer purchasing behavior 96.

Figure 3:
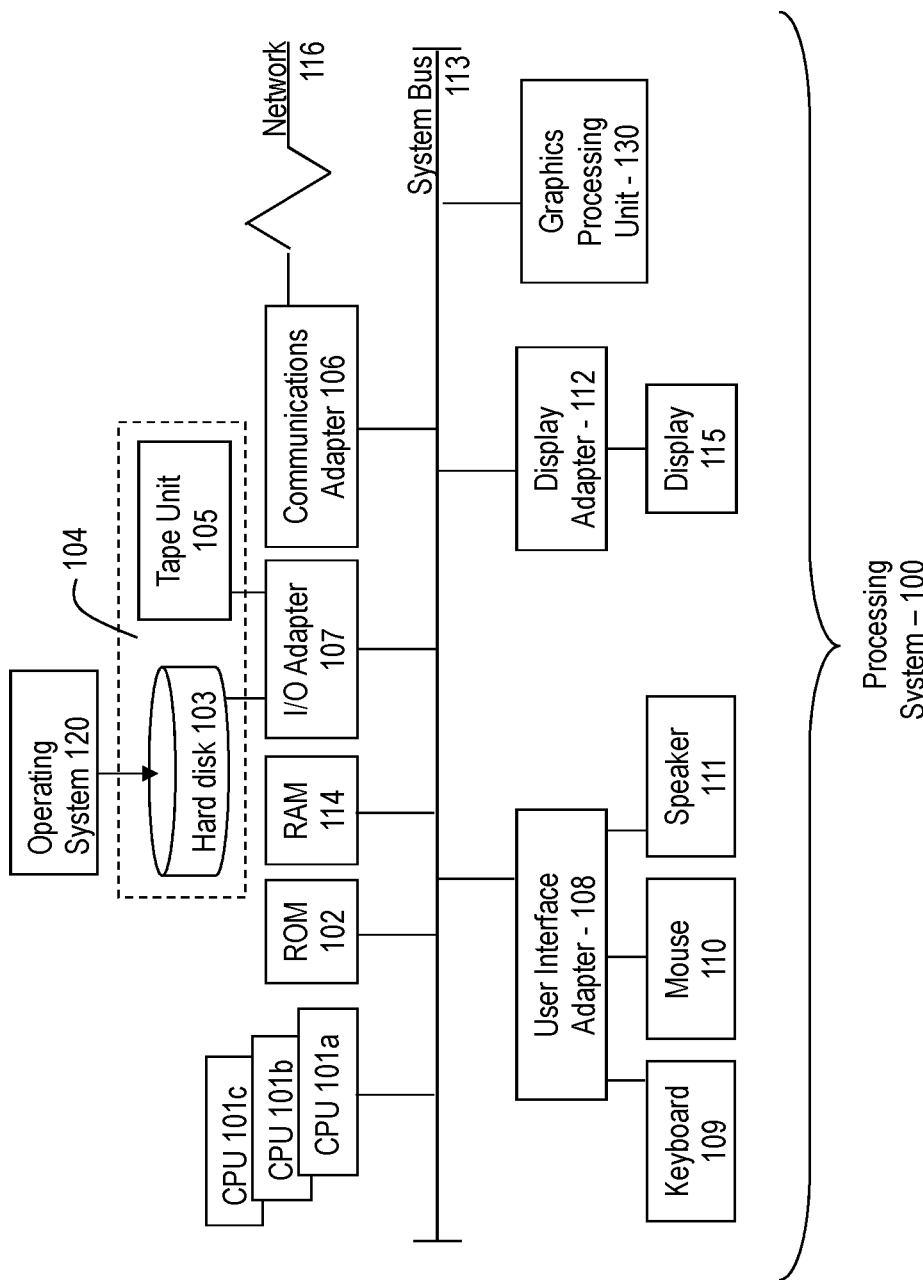
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments of the invention, each processor 101 can include a reduced instruction set computer (RISC) microprocessor. Processors 101 are coupled to system memory 114 and various other components via a system bus 113. Read only memory (ROM) 102 is coupled to the system bus 113 and can include a basic input/output system (BIOS), which controls certain basic functions of system 100.

FIG. 3 further depicts an input/output (I/O) adapter 107 and a network adapter 106 coupled to the system bus 113. I/O adapter 107 can be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 can be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which can include a graphics adapter to improve the performance of graphics intensive applications and a video controller. In one embodiment, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which can include, for example, a Super I/O chip integrating multiple device adapters into a single integrated circuit.

In exemplary embodiments of the invention, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
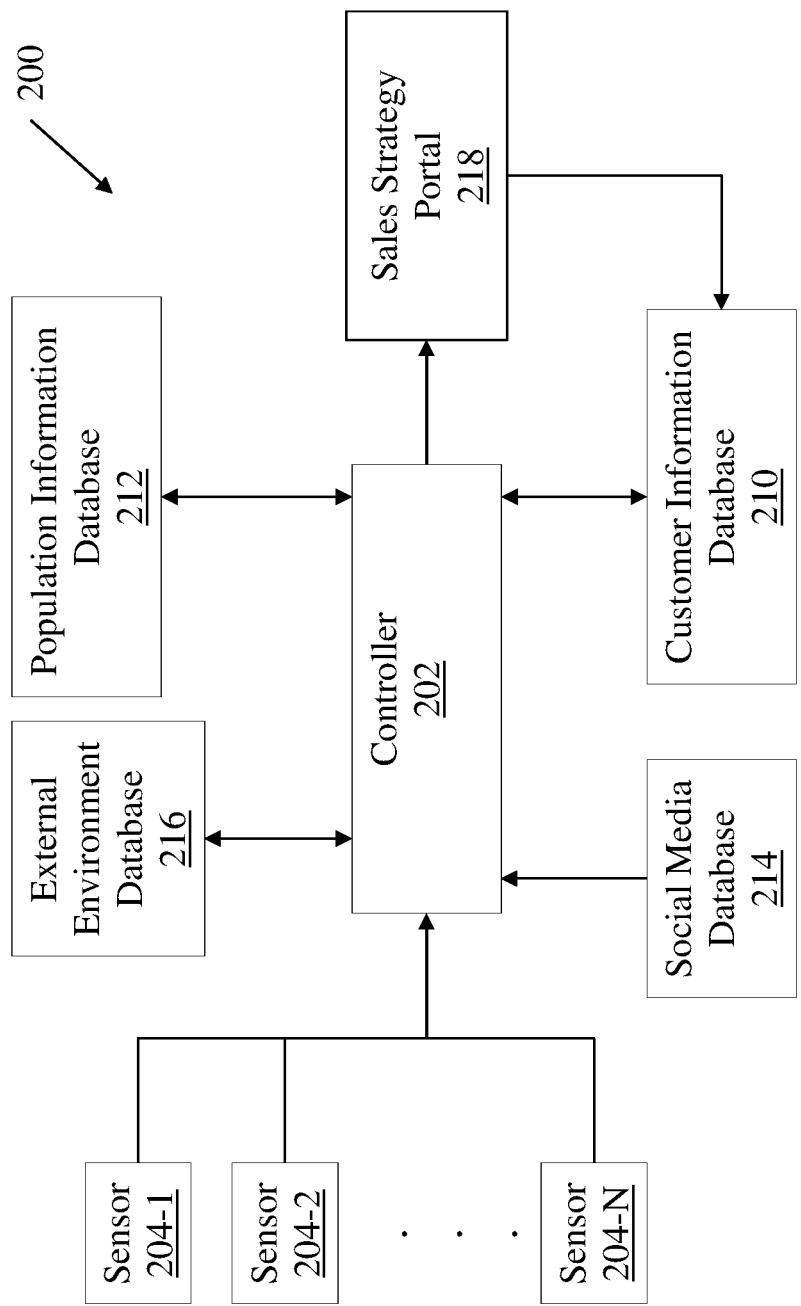
FIG. 4 illustrates a block diagram of a system for predicting customer purchasing behavior in accordance with one or more embodiments of the present invention.

Referring to FIG. 4, there is shown a system 200 for predicting customer purchasing behavior according to one or more embodiments of the invention. The system 200 includes a controller 202, one or more sensors 204-1, 204-2, 204-N (where N=any whole number greater than 2), a customer information database 210, a population information database 212, a social media database 214, an external environment database 216, and a sales strategy portal 218, configured and arranged as shown.

In one or more embodiments of the invention, the controller 202 can be implemented on the processing system 100 found in FIG. 3. Additionally, the cloud computing system 50 can be in wired or wireless electronic communication with one or all of the elements of the system 200. Cloud 50 can supplement, support or replace some or all of the functionality of the elements of the system 200. Additionally, some or all of the functionality of the elements of system 200 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

The system 200 can be implemented in a retail establishment such as, for example, a clothing store and a car dealership. The system 200 includes one or more sensors 204-1, 204-2 . . . 204-N (wherein N=any whole number greater than 2) that are in electronic communication with the controller 202. The sensors 204-1, 204-2, 204-N can be any type of sensor such as a facial recognition camera, a key fob sensor, a credit card scanner and the like. The sensors 204-1, 204-2, 204-N are configured to collect sensor data on incoming or present customers in a retail environment. The sensor data can be facial recognition data that can be used to help identify a customer. The sensor data can also be used to gather accompaniment data about the accompaniments of a customer. An accompaniment includes any companions of the customer such as family members, friends, service animals, and the like. Additionally, an accompaniment includes any bags or items brought in by the customer such as a shopping bag from another retail establishment.

In one or more embodiments of the invention, a customer enters a retail establishment and is scanned by the sensors 204-1, 204-2, 204-N. The sensors determine an identity of the customer through a variety of techniques, including, for example, facial recognition. Based at least in part on the identity of the customer, the controller 202 accesses the customer information database 210 to pull a customer profile that contains historical information about the customer, along with demographic information about the customer such as name, age, income level, and the like. The historical information of the customer can also include information related to previously purchased items (articles) or services, as well as information related to the customer's family and friends that have accompanied the customer in the retail establishment in the past.

Accompaniment data of the accompaniments of the customer are recorded by the sensors 204-1, 204-2, 204-N. The accompaniment data can be used by the system 200 to provide purchasing and preference information to the retail establishment. The controller 202 can pull from additional data sources to develop a sales strategy to present to the sales strategy portal 218. A sales person or manager can utilized the sales strategy portal 218 to first identify the customer as a customer that may be interested in a particular article or item for sale or a particular service offered by the retail establishment.

In one or more embodiments of the invention, the sales strategy can include a list of historical purchases of the customer. The sales strategy can provide coupons or discounts for certain items that the customer is likely to purchase. The sales strategy can draw the customer's attention to certain items that the customer may be likely to purchase based on their accompaniments. For example, lights, LEDs, arrows, and the like can be utilized to draw the customer to a portion of the retail establishment to purchase a particular item or group of items.

In one or more embodiments of the invention, the controller 202 pulls data from an external environment database 216. The external environment database 216 contains information external to the retail environment such as, for example, weather information, temperature, results of the stock market, the day of the week or month, the general crowdedness of the retail establishment, and nearby events occurring that day. Environmental data can be used to develop a sales strategy. For example, if the stock market data shows that the market is performing poorly, the sales strategy may direct the customer to certain deals or discounted items based on the performance of the stock market that day. In another example, if the retail establishment is overcrowded, a sales strategy may be developed to draw customers to portions of the retail establishment that are less crowded. Another strategy would be to draw customers to items they may purchase quickly to clear out room for additional customers.

In one or more embodiments of the invention, the controller 202 can identify the customer from the sensor data but may be unable to identify the accompaniments of the customer, such as one or more individuals accompanying the customer. The controller can pull social media data from the social media database 214 to try to identify the accompanying individuals as family, friends, co-workers, and the like. Based at least in part on the social media data, the controller 202 can develop a sales strategy for the customer based on the relationship of the individuals to the customer.

In one or more embodiments of the invention, the controller 202 can receive population data from the population information database 212. Population data can include sales information about customers based on their demographics. For example, a customer within a certain age group may be more likely to purchase certain items than a customer in a different age group. Additionally, the accompaniments of a customer can be determined based on this population data.

In some instances, the sensors 204-1, 204-2, 204-N cannot recognize the customer (e.g., because this is a first visit by the customer to the retail establishment). In one or more embodiments of the invention, the sensors 204-1, 204-2, 204-N can collect demographic information about the customer and deliver to the controller 202. The controller 202 can compare that demographic information to population data taken from the population information database 212. Additionally, a customer profile can be created and stored in the customer information database 210 for future reference. The accompaniment data of the accompaniments and any purchases made by the customer can be stored in the customer profile on the customer information database 210. Additional information about the customer can be obtained at the point of sale such as name, address, payment information and the like. Or customer information can be obtained from the customer directly through a survey submitted to the retail establishment. Information on the accompaniments, such as the name of a relative or friend can be obtained through similar means.

In one or more embodiments of the invention, accompaniments can include items such as shopping bags, clothing accessories, food or drink, and the like. A customer may enter carrying a shopping bag for another retail establishment that could specialize in selling certain items. Based upon what the customer has already purchased, the controller 202 can develop a sales strategy to direct the customer towards purchasing accessories for their previously purchased accompaniments. Another example, should a customer enter a pet store accompanied by an animal such as a cat or dog. The sales strategy would be geared towards purchases for that specific type of animal (e.g., cat toys, dog toys, etc.).

The accompaniment data can be used to develop multiple sales strategies. The controller 202, based on the sensors 204-1, 204-2, 204-N identification of the customer, can recognize the customer as a recurring purchaser and use the accompaniments and other environmental data to derive both the likelihood of a purchase and what particular items or services the customer may purchase. The likelihood of purchase can be a derived value, such as a likelihood score, that can be compared to a threshold value. For example, the likelihood score can be on a scale from 1-10 with 10 being the highest likelihood of purchase. A threshold can be set at a value on the scale, such as 5. In this example, any scores above 5 would indicate that a customer would likely purchase an item and any scores below 5 would indicate that a customer would not be likely to purchase an item. A sales strategy would be developed for customers with a likelihood score above the threshold. Multiple thresholds can be set where certain sales strategies are developed based at least in part on where the likelihood score for a customer falls on the scale. For example, customers with scores below 3 would have no sales strategy developed. Customers with scores between 3 and 7 can have a sales strategy that is focused on raising the likelihood of purchase. For example, offering a customer a coupon for a product can influence customers who may have a likelihood score between 3 and 7. Customers with likelihood scores above 7 can have a different sales strategy based upon their higher likelihood of purchase.

The controller 202 can analyze trends related to purchases by the customer or trends in the population such as "back to school" shopping time periods. The controller 202 can recognize the customer through the sensor data that can be obtained from facial recognition, a key fob, a credit card scanner and the like.

In another example, a customer may enter a retail establishment accompanied by a small dog. The controller 202 may identify this customer as a new customer that has not history of purchasing trends. The controller 202 can pull population data for similar walk in customers accompanied by a dog to determine a sales strategy based on likelihood of a purchase and particular items the customer would purchase.

Figure 5:
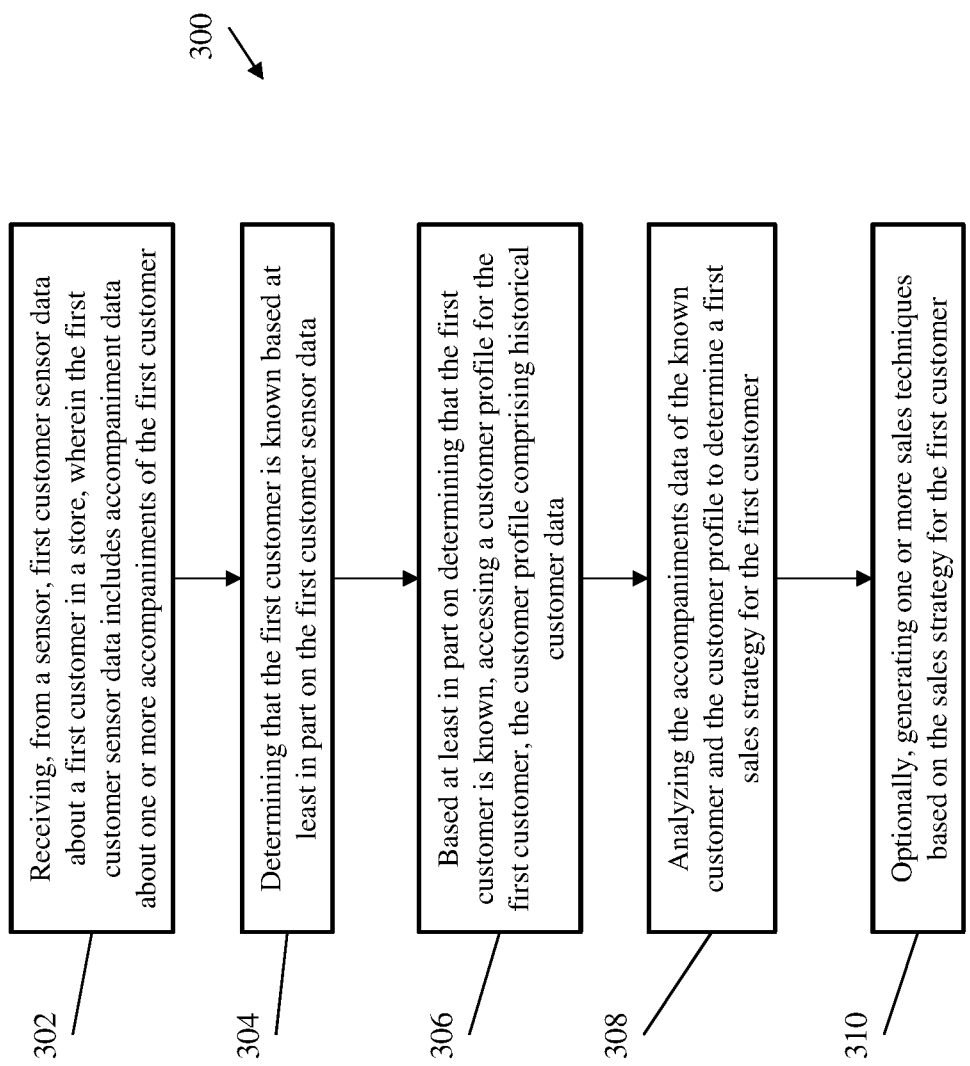
FIG. 5 illustrates a flow diagram of a method for predicting customer purchasing behavior in accordance with one or more embodiments of the present invention.

Referring now to FIG. 5 there is shown a flow diagram of a method 300 for predicting customer purchasing behavior according to one or more embodiments of the invention. The method 300 includes receiving, from a sensor, first customer sensor data about a first customer in a store, wherein the first customer sensor data includes accompaniment data about one or more accompaniments of the first customer, as shown at block 302. Block 304 determines that the first customer is known based at least in part on the first customer sensor data. In block 306, based at least in part on determining that the first customer is known, a customer profile for the first customer is accessed, wherein the customer profile includes historical customer data. Block 308 analyzes the accompaniment data and the customer profile to determine a first sales strategy for the first customer. Block 310 optionally generates one or more sales techniques based on the sales strategy for the first customer.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for predicting customer purchasing behavior, the method comprising:
   obtaining, by a processor operating one or more sensors associated with a store, first customer sensor data about a first customer in the store, wherein the first customer sensor data includes accompaniment data about one or more accompaniments of the first customer, and wherein the sensor data further includes a crowdedness of the store;
   obtaining, via the processor, external environmental data, the external environmental data comprising weather information, stock market results, and nearby events proximate to the store;
   determining, by the processor, that the first customer is known based at least in part on the first customer sensor data;
   based at least in part on determining that the first customer is known, accessing a customer profile for the first customer, the customer profile comprising historical customer data; and
   analyzing the accompaniment data, the external environmental data, and the customer profile to determine a first sales product for the first customer;
   operating, by the processor receiving customer location data from the one or more sensors, a set of lights in the store, the set of lights operated to draw the first customer from a current location to a location of the first sales product, wherein the location of the first sales product is less crowded than the current location.

2. The method of claim 1, further comprising:
   determining a first sales strategy for the first customer based on the accompaniment data, the external environmental data, and the customer profile; and
   generating one or more sales techniques based on the sales strategy for the first customer.

3. The method of claim 2, further comprising:
   receiving, from the sensor, second customer sensor data about a second customer in a store, wherein the second customer sensor data includes accompaniment data about one or more accompaniments of the second customer and demographics of the second customer;
   determining that the first customer is not known based on the second customer sensor data;
   based at least in part on determining the second customer is not known, creating a second customer profile for the second customer;
   accessing population data, wherein the population data comprises historical purchasing data of individuals with demographics and accompaniments that are similar to the demographics and accompaniments of the second customer;
   analyzing the historical purchasing data to determine a second sales strategy for the second customer; and
   generating one or more sales techniques based on the second sales strategy for the second customer.

4. The method of claim 2, wherein the one or more sales techniques includes identifying one or more items for sale that the first customer is likely to purchase based on the first sales strategy.

5. The method of claim 4, further comprising:
   based at least in part on the first customer purchasing the one or more items for sale, updating the first customer profile to reflect the first customer purchase.

6. The method of claim 4, further comprising:
   based at least in part on the first customer not purchasing the one or more items for sale, updating the first customer profile to reflect the lack of purchase by the first customer.

7. The method of claim 3, wherein the one or more sales techniques includes identifying one or more items for sale that the second customer is likely to purchase based on the second sales strategy.

8. The method of claim 7, further comprising:
   based at least in part on the second customer purchasing the one or more items for sale, updating the second customer profile to reflect the first customer purchase.

9. The method of claim 7, further comprising:
   based at least in part on the second customer not purchasing the one or more items for sale, updating the second customer profile to reflect the lack of purchase by the second customer.

10. The method of claim 1, wherein the one or more accompaniments is a companion; and further comprising:
    receiving, from the sensor, companion sensor data about the companion; and
    determining a relationship of the companion to the first customer.

11. The method of claim 10, wherein the determination of the relationship of the companion to the first customer comprises:
    analyzing the first customer profile; and
    determining that the companion is known based on the companion sensor data.

12. The method of claim 10, wherein the determination of the relationship of the companion to the first customer comprises:
    analyzing social media data of the first customer; and
    determining that the companion is present in the social media data of the first customer based on the companion sensor data.

13. The method of claim 11, further comprising:
    updating the first sales strategy based on the relationship of the companion to the first customer.

14. The method of claim 3, further comprising:
    receiving, by the sensor, environmental data; and
    adjusting the second sales strategy based on the environmental data.

15. The method of claim 2, wherein the one or more sales techniques includes a discount offer for an item for sale.

16. A computer system for predicting customer purchasing behavior, the computing system including a processor communicatively coupled to a memory, the processor configured to:
    obtain, through operating one or more sensors associated with a store, first customer sensor data about a first customer in the store, wherein the first customer sensor data includes accompaniment data about one or more accompaniments of the first customer, and wherein the sensor data further includes a crowdedness of the store;
    obtain external environmental data, the external environmental data comprising weather information, stock market results, and nearby events proximate to the store;
    determine that the first customer is known based on the first customer sensor data;
    based at least in part on determining that the first customer is known, access a customer profile for the first customer, the customer profile comprising historical customer data; and analyze the accompaniment data, the external environmental data, and the customer profile to determine a first sales product for the first customer;

operating a set of lights in the store based on customer location data received by the one or more sensors, the set of lights operated to draw the first customer from a current location to a location of the first sales product, wherein the location of the first sales product is less crowded than the current location.

17. The computer system of claim 16, wherein the processor is further configured to:

determine a first sales strategy for the first customer based on the accompaniment data, the external environmental data, and the customer profile; and generate one or more sales techniques based on the sales strategy for the first customer.

18. The computer system of claim 17, wherein the processor is further configures to:

receive, from the sensor, second customer sensor data about a second customer in a store, wherein the second customer sensor data includes accompaniment data about one or more accompaniments of the second customer and demographics of the second customer;

determine that the first customer is not known based on the second customer sensor data;

based at least in part on determining the second customer is not known, create a second customer profile for the second customer;

access population data, wherein the population data comprises historical purchasing data of individuals with demographics and accompaniments that are similar to the demographics and accompaniments of the second customer;

analyze the historical purchasing data to determine a second sales strategy for the second customer; and generate one or more sales techniques based on the second sales strategy for the second customer.

19. A computer program product for predicting customer purchasing behavior, the computer program product comprising a computer readable storage medium having program instructions embodied therewith, the program instructions executable by a processor to cause the processor to perform:

obtaining, by a processor operating one or more sensors associated with a store, first customer sensor data about a first customer in the store, wherein the first customer sensor data includes accompaniment data about one or more accompaniments of the first customer, and wherein the sensor data further includes a crowdedness of the store;

obtaining, via the processor, external environmental data, the external environmental data comprising weather information, stock market results, and nearby events proximate to the store;

determining, by the processor, that the first customer is known based on the first customer sensor data;

based at least in part on determining that the first customer is known, accessing a customer profile for the first customer, the customer profile comprising historical customer data; and analyzing the accompaniments data, the external environmental data, and the customer profile to determine a first sales product for the first customer;

operating, by the processor receiving customer location data from the one or more sensors, a set of lights in the store, the set of lights operated to draw the first customer from a current location to a location of the first sales product, wherein the location of the first sales product is less crowded than the current location.

20. The computer program product of claim 19, further comprising:

determining a first sales strategy for the first customer based on the accompaniment data, the external environmental data, and the customer profile; and generating one or more sales techniques based on the sales strategy for the first customer.

* * * * *